United States Patent

[11] 3,630,554

| [72] | Inventor | Victor B. Cherniak |
| | | 1057 Madison Avenue, Chula Vista, Calif. 92011 |
| [21] | Appl. No. | 22,975 |
| [22] | Filed | Mar. 26, 1970 |
| [45] | Patented | Dec. 28, 1971 |

[54] HANGER CLIP ASSEMBLY
3 Claims, 9 Drawing Figs.

[52] U.S. Cl. .................................................. 287/189.35, 248/317, 52/489
[51] Int. Cl. .................................................. E04g 17/00
[50] Field of Search .......................................... 248/361 TF, 361 W, 317; 287/189.35; 52/358, 359, 360, 489; 24/73 C, 73 CM, 73 PP, 73 SA, 73 TL, 201 LP

[56] References Cited
UNITED STATES PATENTS

| 1,757,462 | 5/1930 | Mack | 24/73 PP |
| 1,431,527 | 10/1922 | Kane | 189/35 |
| 1,624,187 | 4/1927 | Schlafly | 52/360 |
| 837,793 | 12/1906 | Campbell | 52/489 |
| 2,613,416 | 10/1952 | Raynor | 24/73 C |

OTHER REFERENCES
RCA Technical Note No. 576, Dec., 1964

Primary Examiner—William H. Schultz
Attorney—Carl R. Brown

ABSTRACT: A hanger clip assembly comprising a clip for attachment between a supporting member and a structure to be supported, and a locking pin which is easily inserted and removed without tools. A looped portion of the clip passes through a hole in one of the structural elements, the locking pin fitting through the loop and having safe locking detent means. The locking pin will not work loose or become detached under normal stresses of the structure, but can be removed intentionally with a minimum of effort.

PATENTED DEC 28 1971 3,630,554

INVENTOR.
VICTOR B. CHERNIAK
BY Carl R. Brown
ATTORNEY

HANGER CLIP ASSEMBLY

BACKGROUND OF THE INVENTION

Hangers for holding lighting fixtures, suspended ceilings, pipes and other members usually have screw threaded or similar securing means requiring the use of tools. A single worker must often support parts of the structure while attaching the hangers, leaving only one hand free for manipulation of the hangers and tools. Since the hangers are frequently in a confined space, fastening of threaded clamps and the like is tedious. A secure hanger which can be fastened quickly without tools would be a great advantage in such instances.

SUMMARY OF THE INVENTION

The hanger clip assembly described herein comprises a clip and a locking pin, each a unitary element formed from wire or the like. The clip is shaped to fit over and hold a structural member and has a loop portion which extends through a hole in another structural member, the locking pin being snapped through the loop to secure the assembly. Various configurations of the clip can be used for specific structural members, with resilient end portions which are snapped over and grip the members. Detent portions formed in the locking pin engage and lock on the clip and, in most instances, in the hole in the structural member as well. When locked in place, the locking pin will not become displaced unless intentionally forced.

The primary object of this invention, therefore, is to provide a new and improved hanger clip assembly.

Another object of this invention is to provide a new and improved hanger clip assembly which can be installed without tools.

Another object of this invention is to provide a new and improved hanger clip assembly which is self-locking, but can be intentionally dismantled without tools.

A further object of this invention is to provide a new and improved hanger clip assembly which is adaptable to a variety of structural assemblies.

Other objects and many advantages of this invention will become more apparent upon a reading of the following detailed description and an examination of the drawing, wherein like reference numerals designate like parts throughout and in which:

DESCRIPTION OF THE PREFERRED EMBODIMENTS

Figure 1:
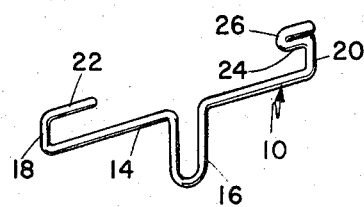
FIG. 1 is a perspective view of the basic form of the hanger clip.
Figure 2:
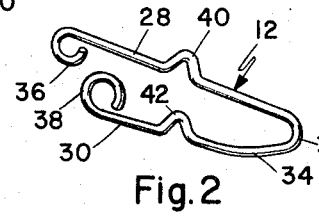
FIG. 2 is a perspective view of the basic form of locking pin.

The basic form of the hanger clip assembly, shown in FIGS. 1 through 4, comprises a clip 10 and a locking pin 12, both made of resilient wire material or the like, the size of which may vary to suit the particular purpose.

Clip 10 has a bar portion 14, at the center of which is an elongated, generally U-shaped loop 16. At opposite ends of bar portion 14 are short perpendicular legs 18 and 20 extending on the side opposite loop 16. Leg 18 has an inwardly turned arm 22 and leg 20 has a somewhat shorter inwardly turned arm 24, with a return folded inner end 26. The lip is shown as a planar element, but legs 18 and 20 could be inclined to the plane of loop 16 for some purposes.

Locking pin 12 is a planar element with a substantially straight pressure bar 28 and a spaced retaining bar 30, joined at one end by a return folded bight portion 32. Retaining bar 30 converges toward bight portion 32 to form a tapered entry tip 34. The pressure bar 28 has a rolled tip 36 at the end opposite bight portion 32, the retaining bar 30 being shorter and having a larger rolled tip 38, the rolled tips both projecting inwardly toward the opposite bar element. Near the center of pressure bar 28 is an offset locking loop 40 projecting opposite to rolled tip 36. Retaining bar 30 has a similar locking loop 42 aligned with and offset in the same direction as locking loop 40.

Figure 3:
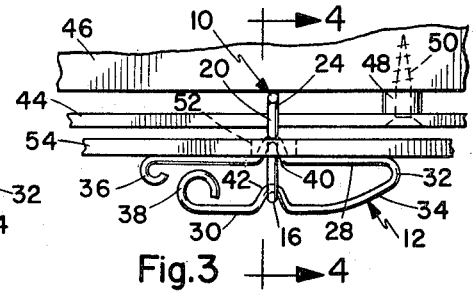
FIG. 3 is a side elevation view of a typical assembly.
Figure 4:
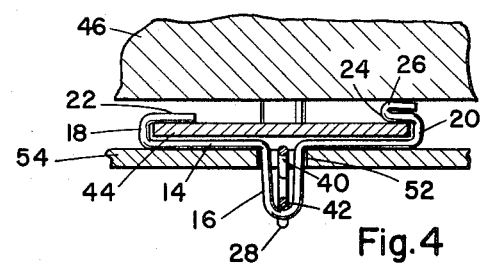
FIG. 4 is a sectional view taken on line 4—4 of FIG. 3.

In the assembly shown in FIGS. 3 and 4, a support plate 44 is fixed below supporting structure 46 by spacers 48 and screws 50. The width of support plate 44 is slightly less than the distance between legs 18 and 20, so that arm 22 can be engaged over one edge of the plate and the clip stretched by its resilience to allow the smoothly rounded arm 24 to be snapped over the other edge of the plate. Loop 16 thus extends downwardly from support plate 44, through a hole 52 in a member 54 to be suspended. Locking pin 12 is then applied by inserting entry tip 34 through the loop 16 and pushing the pin across perpendicular to bar portion 14, until locking loop 40 snaps into hole 52 and locking loop 42 snaps over loop 16. The locking pin is held against removal and supports the member 54 securely, any suitable number of hanger clips being used to hold a particular assembly.

The member 54 could be part of a lighting fixture, a suspended ceiling, or other such suspended structure. With the locking pin held in planar alignment in loop 16, rolled end 38 bears on pressure bar 28 and prevents the retaining bar 30 from being depressed sufficiently to release locking loop 42. Under normal structural loads the locking pin will not work loose and can be removed only by forcibly displacing rolled end 38 and depressing the retaining bar 30 manually.

Figure 5:
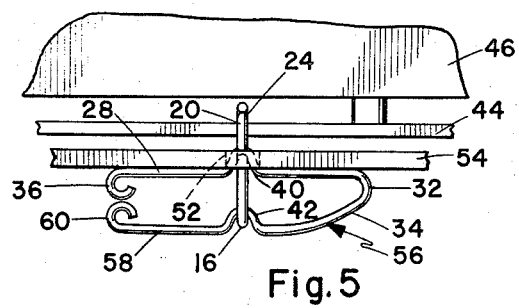
FIG. 5 is a view similar to FIG. 3, showing an alternative form of locking pin.

The assembly shown in FIG. 5 is similar to the described above, the difference being in a modified locking pin 56. The locking pin 56 is similar in all respects to locking pin 12, except for an extended retaining bar 58 equal in length to pressure bar 30, and having a small rolled end 60. In assembled position the rolled ends 36 and 60 meet and prevent collapse of the locking pin.

Figure 6:
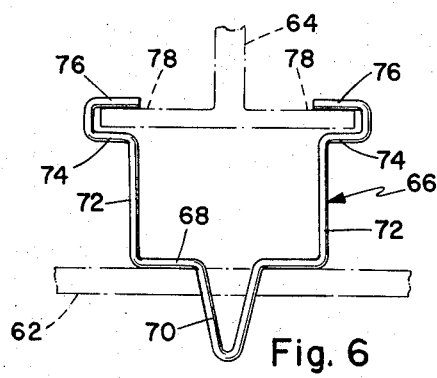
FIG. 6 is a view of a modified hanger clip with spacing elements.

The hanger clip can be modified to suit specific structural supports and members. In FIG. 6 a member 62 is shown suspended below an I-beam 64, or the like, by a hanger clip 66. The modified hanger clip has a bar portion 68 with a central offset loop 70 and legs 72 at opposite ends. Legs 72 are of any required length to space member 62 from the beam 64. At the upper ends of legs 72 are outwardly turned shoulder portions 74, with inwardly return folded arms 76 to grip the flanges 78 of beam 64. The resiliency of extended legs 72 facilitates spreading the clip to fit over the beam. Either locking pin 12 or locking pin 56 may be inserted through loop 70 to secure the assembly. It should be noted that hanger clip 10 could also be attached to beam 64 if it is not necessary to space member 62 from the beam.

Figure 7:
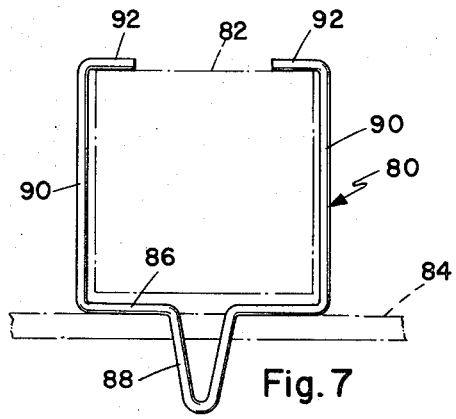
FIG. 7 is a view of a hanger clip for a square or similar cross-sectioned member.

A further clip 80, shown in FIG. 7, is adapted to fit over a square or rectangular support 82 to hold a member 84. Clip 80 has a bar portion 86 with a loop 88 and lets 90 of sufficient length to fit support 82, the legs having inwardly turned arms 92 which engage and grip the support.

Figure 8:
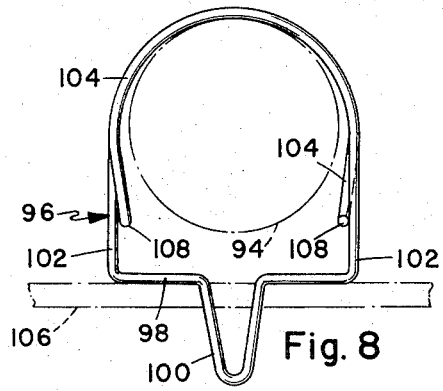
FIG. 8 is a view of a hanger clip for a cylindrical member.

For cylindrical members, such as a pipe 94 shown in FIG. 8, the clip 96 is modified to fit the pipe. Clip 96 has a bar portion 98 with a loop 100 and legs 102, the ends of the legs having curved arms 104 which overlap around pipe 94. For adequate support of a member 106, the ends of arms 104 have laterally turned tips 108 which are engaged inside legs 102, to prevent the clip from opening. With light loads this latter locking feature may not be necessary.

Figure 9:
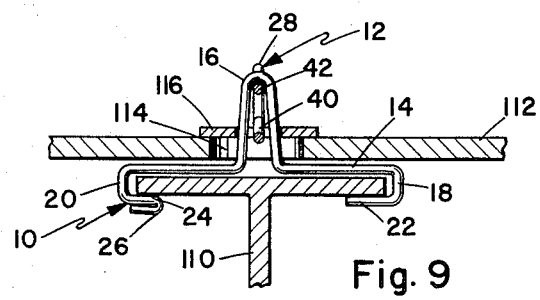
FIG. 9 is a sectional view of an assembly with the hanger clip inverted.

Any of the clips may be inverted from the position shown to hang various structures from a supporting member having a hole to accept the loop of the clip. An example is shown in FIG. 9, in which clip 10 and locking pin 12 suspend a beam 110 from a support 112. In this instance the support is shown as having a hole 114 considerably larger than necessary for loop 16. To secure the loop and hold the clip closed on beam 110, a washer 116 is placed over loop 16 before locking pin 12 is inserted. This washer arrangement may be used with any of the clips for attachment through existing holes in certain structures, thus avoiding the necessity for drilling special holes.

The clip configurations shown are merely examples. Using the basic loop arrangement and gripping portions, the leg portions of the clip can be shaped to fit any particular structure. The shoulder configuration, shown in FIG. 6, may be applied to other clips to spaced the connected elements as required. In most instances it will be possible to insert the locking pin with one hand, greatly facilitating hanging of lighting fixtures and other such structures which must be held and positioned by hand.

Having described my invention, I now claim:

1. A hanger clip assembly, comprising:
    a clip for connection between a support and a member to be supported, and a locking pin interfitting with said clip;
    said clip having a bar portion with a substantially U-shaped loop offset to one side, the ends of said bar portion having legs extending generally opposite to said loop, the ends of said legs having opposed projecting arms to engage over a structural member;
    said locking pin having a pair of bar elements with an interconnecting return folded portion at one end, one of said bar elements having an offset locking loop engageable with the loop of said loop substantially perpendicular to said bar portion;
    and said bar elements being coplanar, and the other end of at least one of said bar elements having an inwardly rolled portion engageable with the other bar element to limit the minimum spacing therebetween.

2. A hanger clip assembly according to claim 1, wherein said arms are inwardly turned, one of said arms being shorter than the other and having a smoothly rounded inner end.

3. A hanger clip assembly according to claim 1, wherein the other of said bar elements has a similar locking loop for engagement in a hole in a member through which the loop of said clip is passed.

* * * * *

UNITED STATES PATENT OFFICE
CERTIFICATE OF CORRECTION

Patent No. 3,630,554          Dated  December 28, 1971

Inventor(s)    Victor B. Cherniak

It is certified that error appears in the above-identified patent and that said Letters Patent are hereby corrected as shown below:

Column 4, line 8, after "said", insert --clip when the locking pin is passed through the--

Signed and sealed this 16th day of May 1972.

(SEAL)
Attest:

EDWARD M. FLETCHER, JR.          ROBERT GOTTSCHALK
Attesting Officer                Commissioner of Patents